United States Patent [19]

Pons et al.

[11] 4,110,285

[45] Aug. 29, 1978

[54] PROCESS FOR THE PREPARATION OF STABLE AQUEOUS EMULSIONS OF ADDITION POLYMERS AND COPOLYMERS

[75] Inventors: Dick A. Pons, Maassluis; Anno Bijker, Spijkenisse, both of Netherlands

[73] Assignee: Synres International B.V., Hoek Van Holland, Netherlands

[21] Appl. No.: 725,118

[22] Filed: Sep. 20, 1976

[30] Foreign Application Priority Data

Sep. 25, 1975 [NL] Netherlands .......................... 7511276

[51] Int. Cl.² ............................................... C08L 33/08
[52] U.S. Cl. ........................ 260/29.6 MP; 260/45.7 P
[58] Field of Search .................... 260/29.6 MP, 45.7 P

[56] References Cited

U.S. PATENT DOCUMENTS

| 3,575,944 | 4/1971 | Stroh | 260/29.6 MP |
| 3,919,383 | 11/1975 | Yankowsky | 260/45.7 P |

*Primary Examiner*—M. J. Welsh
*Attorney, Agent, or Firm*—Cushman, Darby & Cushman

[57] ABSTRACT

In emulsion polymerizations the improvement of using a mixture of phosphate esters of the formula $(RO)_2PO(OH)$ and $(RO)PO(OH)_2$, where RO is an alkoxy radical of an unsaturated polymerizable alcohol of 2 to 12 carbon atoms, or of A-B which is derived from A and B where A is an acid radical of an unsaturated polymerizable carboxylic acid of 3 to 25 carbon atoms and B is a radical of a divalent alcohol, in an amount of between 0.1, and 15% by weight based on the total weight of polymerizable compounds.

11 Claims, No Drawings

PROCESS FOR THE PREPARATION OF STABLE AQUEOUS EMULSIONS OF ADDITION POLYMERS AND COPOLYMERS

BACKGROUND OF THE INVENTION

Aqueous dispersions of olefinically unsaturated monomers can be subjected to polymerization conditions to form emulsions of an addition polymer or copolymer. Emulsions of this type can be used in the preparation of paints and lacquers and bonding agents. Such emulsions can be obtained by polymerizing one or more monomers in aqueous dispersion with a suitable catalyst system and the necessary emulsifiers, stabilizers and other additives. To obtain a stable emulsion certain combinations of emulsifiers are used in most cases; alternatively, protective colloids are added. The disadvantage of these processes is that, under given conditions, these stabilizing compounds can combine with other substances in the emulsion, such as e.g., pigments, so that reduction of the storage stability and of the mechanical stability of the emulsion results. A further disadvantage is that the emulsifiers and the protective colloids used to stabilize the emulsion are retained in the coat of paint or lacquer as foreign components.

SUMMARY OF THE INVENTION

According to the invention, stable emulsions of an addition polymer in water are prepared by an improvement in the process of polymerizing one or more olefinically unsaturated monomers dispersed in water in the presence of a suitable catalyst system, and optionally in the presence of one or more emulsifiers, emulsion stabilizers, or any other conventional additives. The improvement is in employing in the polymerization an emulsion stabilizer which is a mixture of phosphate esters that contains at least compounds of the formulae $(RO)_2PO(OH)$ and $(RO)PO(OH)_2$, where RO is an alkoxy group of an alcohol derived from an unsaturated polymerizable alcohol of 2-12 carbon atoms, or is A-B-O(alkoxy), where A is an acid radical (carboxylate) derived from an unsaturated polymerizable carboxylic acid of 3-25 carbon atoms and B is a radical derived from a divalent alcohol.

DESCRIPTION OF THE INVENTION

The improvement of the invention provides a stabilizer which is incorporated into the polymer to be stabilized, during the process of preparing the polymer. Thus, polymers and emulsions thereof produced in accordance with the invention show very good stability, even in mechanical treatments in which shear forces occur, while the coats of paint or lacquer obtained from these emulsions show excellent adhesion to metal and an increased scrubbing resistance.

The coatings based on emulsions obtained according to the invention are resistant to yellowing, even after being enamelled. Another asset of the mixture used as a stabilizer is that it readily dissolves in most monomers. Because of the acid groups on the phosphate esters of the stabilizer mixture, further modification of the emulsion with, e.g., bases and amines is possible. It is also advantageous that the diphosphate ester causes cross-linking, without giving rise to gelling. It should furthermore be noted that the phosphate esters used have a better resistance to hydrolysis than the reaction products of, e.g., glycidyl(meth)acrylate with phosphoric acid.

According to the invention, the stabilizer is a mixture consisting at least of compounds of the formulae $(RO)_2PO(OH)$ and $(RO)PO(OH)_2$. The OR group may be derived from an unsaturated polymerizable alcohol of 2-12 carbon atoms, such as allyl alcohol, crotyl alcohol, undecylene alcohol, cinnamyl alcohol. Furthermore, the RO group may denote an A-B-O group, i.e., a residue derived from an hydroxyalkyl ester where A represents an acid radical derived from an unsaturated polymerizable carboxylic acid of 3-25 carbon atoms, and B represents a radical derived from a divalent alcohol. The acid radical A may be derived from acrylic acid, methacrylic acid, crotonic acid and monoesters of (1) a dicarboxylic acid, such as fumaric acid, maleic acid, or itaconic acid, and (2) an alcohol of 1-20 carbon atoms, such as methanol, ethanol, propanol, butanol, heptanol, 2-ethyl hexanol, decanol, tridecanol, cyclohexanol or benzyl alcohol.

Examples of divalent alcohols, i.e., compounds containing two alcoholic hydroxy groups, are the branched or unbranched aliphatic or cycloaliphatic diols of 2-20 carbon atoms, such as ethylene glycol, propylene glycol, 1,4-butane diol, 1,2-butane diol, 1,2-hexane diol, 1,2-decane diol, 1,2-dodecane diol, or 1,4-bis(hydroxymethyl)-cyclohexane. Other divalent alcohols are the polyoxyalkylene glycols of 2-100 units derived from ethylene glycol, propylene glycol, 1,2-butane diol, or 1,4-butane diol, such as diethylene glycol, triethylene glycol, tetraethylene glycol, dipropylene glycol, tripropylene glycol, and higher polyoxyalkene glycols. Still other suitable diols are diols containing an aromatic ring, such as, e.g., 1,4-bis(hydroxymethyl) benzene, and hydroxyl-terminal polyacetones with molecular weights of between 200 and 1000, such as e.g., polycaprolactone. Thus, the divalent alcohol may be defined as an aliphatic diol, cycloaliphatic diol, polyoxyalkylene glycol, diol of di-hydroxyalkyl substituted-benzene (said alkylgroup containing 1-4 carbon atoms) or hydroxy-terminated polyacetones of molecular weights ranging from 200 to 1000.

In general, $(ABO)_2PO(OH)$ and $(ABO)PO(OH)_2$ compounds are easier to prepare and to handle, and, hence, are preferred. Stabilizers that are particularly preferred are the mixtures of compounds in which A has been derived from an acrylic acid, methacrylic acid or crotonic acid and B has been derived from a branched or unbranched divalent aliphatic alcohol of 2-6 carbon atoms. Examples are the phosphate esters of hydroxyethyl (meth)-acrylate, hydroxyethyl crotonate, 6-hydroxyhexyl (meth)-acrylate, 4-hydroxybutyl (meth)-acrylate, and 4-hydroxybutyl crotonate.

The mixtures used as stabilizer may be prepared, in a known way, by re-esterification or direct esterification of the alcoholic hydroxy compound with phosphorus pentoxide, polyphosphoric acid, or phosphorus oxychloride. Use of the last two esterification agents will result in phosphoric acid and hydrochloric acid, respectively, as by-products. The stabilizer is preferably prepared by reacting the ROH compound with phosphorus pentoxide in a molar ratio of between 3:1 and 1:1, preferably between 3:1 and 2:1, in particular between 2.75:1 and 2.5:1.

The reaction may be carried out in the presence of an inert solvent or a polymerization inhibitor, preferably at a temperature of between 20° and 45° C. As a result, a mixture of the monophosphate, the diphosphate and polyphosphates are obtained which contain traces of the triphosphate and of phosphoric acid. The reaction product may be used as a stabilizer without further treatment. The polyphosphates decompose in water to form mono- and diphosphate esters and, hence do not interfere.

The invention also comprises an alternative embodiment which is the use as stabilizers of mixtures that contain not only the monophosphate and the diphosphate, but also compounds of the formulae $(MO)_2PO(OH)$ and $(RO)(MO)PO(OH)$, where MO denoted an alkoxy radical of an MOH hydroxyl compound of 2–30 carbon atoms (which is different from ROH an which is an alkoxy radical of a monoalcohol. These mixtures are prepared by first reacting the ROH compound with phosphorus pentoxide and then reacting the reaction product with the M-OH compound. The MOH compound may be an aliphatic monoalcohol of 2–20 carbon atoms, such as ethanol, butanol, decanol, 2-ethyl hexyl alcohol, dodecanol, or tridecanol. It may furthermore be a polyalkylene glycol that has been esterified or esterified on one side, such as monomethoxytriethylene glycol, monoethoxy-dipropylene glycol, monomethoxydodecaethylene glycol, monophenoxypenta-ethylene glycol, monobutoxy-dibutylene glycol. MOH may also be an alcohol containing an aromatic ring, such as benzyl alcohol, or another monohydroxy compound, such as, e.g., hydroxyethyl-ethylene urea, hydroxybenzophenone, or the beta-hydroxyethyl ester of meta-nitrocinnamic acid. The MOH compound may have functional groups other than the hydroxyl group, as long as those functional groups are inert to the preparation and the polymerization conditions. The alternative embodiment of reacting the monophosphate or diphosphate emulsion stabilizer with an MOH compound is not preferred, unless a special effect is obtained by the presence of the (MO) group, such as, e.g., improvement of the adhesion of a polymeric coating from emulsions prepared by the invention, on a painted surface owing to the presence of the hydroethylethylene urea radical or photosensitization owing to the presence of the benzophenone radical. Emulsion stabilizer of the invention must contain RO groups.

The stabilizer compound or mixture of compounds may be used in an amount of at least 0.1% by weight based on the total weight of copolymerizable monomers, including the stabilizer. The use of amounts of over 15% by weight is hardly useful, and the stabilizer is preferably used in an amount of between 0.5 and 5% by weight. In general, the amount of emulsion stabilizer may range from 0.1 to 15% by weight based on the total weight of polymerizable monomers. The mixture of phosphate esters used according to the invention may be added at any stage of the polymerization. In most cases, the stabilizer is added together with the main charge of the monomers. However, it is also possible to add the stabilizer, as such or mixed with other monomers, at the very start of polymerization or shortly before the end of the polymerization.

It should be noted that copolymerization in the mass of unsaturated phosphate esters is well known. The compounds resulting from the copolymerization are then used to impart fire-extinguishing or fire-proofing properties to the polymer. According to the invention, however, the compounds are used in emulsion polymerization in such amounts that the fire-extinguishing action of these compounds is negligible and not essential.

The monomers which are polymerized according to the invention consist fully or largely of monomers that do not contain any reactive groups other than the ethylenically unsaturated ones. Examples are the alkyl acrylates, alkyl methacrylates, alkyl maleates, alkyl fumarates, vinyl esters, vinyl ethers, vinyl chloride, ethylene, butadiene, styrene, vinyl toluene, alphamethyl styrene, acrylonitrile. In most cases, mixtures of these monomers are polymerized in order to impart the desired properties to the resulting polymer. In many cases, comparatively small amounts of co-monomers are added to the polymerization, that contain not only the ethylenically unsaturated groups, but also other reactive groups, such as, e.g., carboxyl groups, amide groups, hydroxyl groups, or epoxy groups. Examples of such monomers are acrylic acid, methacrylic acid, fumaric acid, crotonic acid, hydroxyethyl methacrylate, hydroxypropyl methacrylate, ethylene-glycol monoallyl ether, acryl amide, methacryl amide, glycidyl acrylate, glycidyl methacrylate, and allyl-glycidyl ether.

Thus the monomers used in the emulsion polymerization according to the invention preferably comprise at least one monomer from the group consisting of $C_1$–$C_{12}$ alkyl esters of acrylic acid and methacrylic acid, vinyl esters of $C_2$–$C_{12}$ carboxylic acids, styrene, vinyltoluene, butadiene, acrylonitrile and vinylchloride, and optionally one or more monomers from the group consisting of acrylic acid, methacrylic acid, $C_2$–$C_6$ hydroxyalkylesters of acrylic acid and methacrylic acid, acrylamide, methacryl-amide, glycidylacrylate and glycidylmethacrylate.

Emulsion polymerization processes have been described in a great many publications and patent specifications, for instance, in Acrylic Resins, Reinhold 1962, page 112 and following pages, to Acryl and Methacryl Compounds, Springer Verlag 1967, pp. 217–230.

The polymerization may be effected by means of well-known initiators, which dissolve either in the aqueous phase or in the monomer or in both. Examples of suitable types of compounds are persulphates, peroxides, hydroperoxides, azo compounds and redox systems. Depending on the nature of the monomers, the desired properties of the polymer and the desired size of the polymer particles, various types of emulsifiers may be used separately or in combination. In general, both anionic and non-ionic emulsifiers may be used. If so desired, use may also be made of protective colloids. A mixture of an anionic and a non-ionic emulsifier gives best results in most cases. Examples of suitable classes of compounds are sulphonates and sulphates, phosphates, fatty-acid salts, polyalkylene oxides, and esterified or esterified derivatives thereof. The amount of emulsifier or combination of emulsifier depends on the type of monomer and the types of emulsifier. Generally the amount of emulsifier varies between 0.01 and 10% by weight based on the total amount of solids, and, more preferably, an amount of between 0.05 and 5% by weight is used. In some cases the polymerization may be undertaken without emulsifiers.

The polymerization may be carried out in various ways. For instance, by first emulsifying all monomers and other compounds in water and followed by initiating the polymerization. Alternatively, part of the monomers in emulsion may be polymerized; and then other monomers either separately or as a mixture are added. Furthermore, it is possible to polymerize a monomer or a combination of monomers of a given type initially and subsequently to add other monomers or combinations of monomers, so that polymer particles with a layered structure are formed. A comprehensive survey of the various methods of polymerization is described, for instance, in British patent specifications Nos. 1,417 and 1,421,114.

Other compounds may also be present during the polymerization, e.g., chain-length regulators, in particular mercaptans. Furthermore, plasticizers, cross-linking agents, flow-improving agents, thickeners, dye-stuffs or pigments, and the like may be added during or after the polymerization. Optionally, the emulsion may be further stabilized by the addition of ammonia or amines.

According to another aspect of the invention, the emulsions obtained according to the invention are mixed with an aqueous solution of a polymer containing a comparatively high content of carboxyl groups, if so desired in the form of carboxylate groups. Examples are copolymers of styrene, butyl acrylate with 30% by weight of acrylic acid or maleic acid and copolymers of methyl methacrylate with butyl acrylate and acrylic acid. It appears that, due to the presence of the stabilizer used according to the invention, few, if any, problems occur when the emulsion is mixed with such a solution: no agglomeration is found in the resulting mixture. These mixtures can very well be used as a coating agent and produce high-gloss coatings. Another facet of the process according to the invention is that the emulsions obtained according to the invention, especially those with a comparatively high content of stabilizers lend themselves to use in admixture with aqueous emulsions of addition polymers containing at least 2 epoxy groups. These mixtures show good thermosetting behavior. Examples of such polymers are the copolymers of e.g., glycidyl acrylate or glycidyl methacrylate. Consequently, the invention also comprises a process for preparing thermohardenable emulsions by mixing an emulsion obtained by the process according to the invention with an emulsion of an addition polymer containing at least 2 epoxy groups. The thermo "setting" takes place at temperatures of between 20° and 180° C. and gives impact-resistant coatings. The invention will be further illustrated by the following Examples.

EXAMPLE I

First, 13 kg of hydroxyethyl methacrylate (96%) are put in a flask provided with a stirrer and cooling jacket. 7kg of phosphorus pentoxide are then so added over a period of 2 hours that the temperature does not rise to over 40° and 45° C. Subsequently, the mixture is allowed to react at 40°–45° C. for four more hours, after which the reaction product is filtered to remove any unconverted phosphorus pentoxide.

EXAMPLE II 358.3 grams of hydroxyethyl methacrylate (95%) are made to react with 142 grams of phosphorus pentoxide in the way described in Example I. The reaction product is a clear viscous liquid with an acid number (at pH 8.3) of 294, a viscosity of 2000 cP at 25° C. (Haacke viscosimeter, measuring cell E-30 at 187 rpm), and a Gardner color of 4.

EXAMPLE III 250 grams of demineralized water, 3 grams of nonyl-phenol-20-ethene-oxide addition product (commercial product Serdox NNP 20), 2 grams of nonyl-phenol-9.5-ethene-oxide addition product (commercial product Berol 09), 170 grams of styrene, 320 grams of ethyl acrylate, 10 grams of the stabilizer obtained in Example II, and 3.5 grams of sodium bicarbonate are stirred in a flask to form a pre-emulsion.

250 grams of demineralized water are mixed with 0.5 grams of 28.5% of sodium lauryl sulphate (commercial product Sipon EX-UB) in a polymerization flask and heated to 80° C. while an inert gas is passed through. Then 2 grams of potassium persulphate are added, after which the addition of the pre-emulsion is started immediately. The pre-emulsion is added in a period of 3.5 hours while the temperature is maintained at 80° C. The mixture is allowed to react for one more hour at 85° C., after which the resulting emulsion is cooled. The milky blue emulsion is free from coagulate and specks and has a solid content of 49.9%, a pH of 3.2, and a viscosity of 870 cP at 25° C. (Haacke viscosimeter, measuring cell E-30 at 187.5 rpm).

EXAMPLE IV

For the sake of comparison, Example III is repeated, but 10 grams of methacrylic acid are used instead of the stabilizer and 1 gram of bicarbonate.

In this way, a milky white emulsion is obtained which contains 3% by weight of coagulate that sticks to the stirrer and which gives a screening residue of 1% by weight when passed through a 90-mu screen. The film obtained by pouring the emulsion onto a glass plate shows many specks. The emulsion contains 48.4% by weight of solids and has a pH of 6.05 and a viscosity at 25° C. of 90 cP.

It should be noted that a considerably larger amount of emulsifier is required to obtain a more or less acceptable emulsion by the recipe described in this Example.

EXAMPLE V 1897.7 grams of hydroxy-ethyl methacrylate (96%) are made to react with 1000 grams of phosphorus pentoxide in the presence of 1.5 grams of hydroquinone methyl ether in the way described in Example I. Then, a mixture of 216.3 grams of the resulting reaction product, 84.5 grams of 1-(hydroxyethyl)-ethylene urea and 0.347 gram of hydroquinone ethyl ether is heated at 80° C. with stirring until an acid number of about 313 has been reached. In this way, a clear, light-yellow liquid is obtained which has a viscosity of about 1200 p (measured by Noury & v.d. Lande's method). This product may be used as a stabilizer in the emulsion polymerization according to Example III, and as a bonding agent for the web adhesion of latex paints to an old alkyd-resin paint.

What is claimed is:

1. In a process for preparing an emulsion of an addition polymer in water by co-polymerizing at least one olefinically unsaturated monomer dispersed in water, in the presence of a suitable catalyst system, with at least one emulsion stabilizer, the improvement wherein a mixture, in an amount of between 0.1 and 15% by weight calculated to the total amount of polymerizable compounds, of phosphate esters of the formulae $(RO)_2PO(OH)$ and $(RO)PO(OH)_2$, is used as an emulsion stabilizer, and wherein RO represents the residue remaining after the removal of the hydroxyl hydrogen from an unsaturated polymerizable alcohol of 2 to 12 carbon atoms, or an A-B-O group, in which A represents the residue remaining after the removal of the acid hydrogen from an unsaturated polymerizable carboxylic acid having 3 to 25 carbon atoms and, B is an alkylene or cycloalkylene radical of from 2 to 20 carbon atoms, or a polyoxyalkylene radical having from 2 to 100 units the bonding between A and B being a carbon-oxygen-carbon bonding.

2. Process according to claim 1, wherein the stabilizer is used in an amount of between 0.5 and 5% by weight.

3. Process according to claim 1, wherein the stabilizer is the reaction product obtained by reaction, of ROH, where R has the above meaning, with phosphorus pentoxide.

4. Process according to claim 3, wherein the stabilizer is the reaction product obtained by reacting ROH with the phosphorus pentoxide in a molar ratio of between 2.75:1 and 2.5:1.

5. A process according to claim 1 wherein said stabilizer contains at least a compound of the formula $(ABO)_2PO(OH)$ or $(ABO)PO(OH)_2$, wherein the unsaturated polymerizable carboxylic acid of A is selected from the group consisting of acrylic acid, methacrylic acid and crotonic acid, and B represents an alkylene radical having from 2 to 6 carbon atoms.

6. A process according to claim 1 wherein said emulsion stabilizer also contains a compound of the formula $(RO)(MO)PO(OH)$ or $(MO)_2PO(OH)$, wherein the group MO represents an alkoxy group having from 2 to 30 carbon atoms which is either unsubstituted, or substituted only with a functional group which is inert under the conditions of the polymerizing step.

7. Process for preparing a stable aqueous emulsion, wherein an emulsion prepared by the process of claim 1 is mixed with an aqueous emulsion of an addition polymer containing a comparatively high content of carboxyl or carboxylate groups.

8. Process for preparing emulsions capable of setting, wherein an emulsion obtained by the process of claim 1 is mixed with an aqueous emulsion of an addition polymer containing at least 2 epoxy groups per mole.

9. Emulsions obtained by the process according to claim 1.

10. Process according to claim 1, wherein said emulsion stabilizer is incorporated in the polymer.

11. The emulsion produced by claim 10.

* * * * *